United States Patent [19]

Murao et al.

[11] Patent Number: 5,232,969
[45] Date of Patent: Aug. 3, 1993

[54] STABILIZED POLYOXYMETHYLENE MOLDING COMPOSITIONS AND MOLDED ARTICLES FORMED THEREOF

[75] Inventors: Toshiro Murao; Kaoru Yamamoto; Keiichi Kanaka; Mitsuharu Kusagaya, all of Shizuoka, Japan

[73] Assignee: Polyplastics Co., Ltd., Osaka, Japan

[21] Appl. No.: 809,617

[22] Filed: Dec. 19, 1991

[30] Foreign Application Priority Data

Dec. 20, 1990 [JP]  Japan .................................. 2-404426
Jan. 24, 1991 [JP]  Japan .................................. 3-007181

[51] Int. Cl.$^5$ .......................... C08K 5/09; C08K 5/06; C08K 5/34
[52] U.S. Cl. ...................... 524/394; 524/99; 524/100; 524/291; 524/367; 524/368; 524/369; 524/375; 524/593
[58] Field of Search ............... 524/368, 375, 133, 147, 524/155, 593, 367, 369, 99, 100, 291, 394, 366

[56] References Cited

U.S. PATENT DOCUMENTS 3,404,992  10/1968  Strobel et al. ...................... 524/593

FOREIGN PATENT DOCUMENTS 0281148  9/1988  European Pat. Off. .
2139233A  11/1984  United Kingdom .

OTHER PUBLICATIONS

Trade Names of Macromolecules, Macromolecules-2, Hans-Georg Elias, Appendix, table A2, Plenum Press N.Y. 1977.

Primary Examiner—Paul R. Michl
Assistant Examiner—Tae H. Yoon
Attorney, Agent, or Firm—Nixon & Vanderhye

[57] ABSTRACT

Novel moldable, highly stable, normally solid polyoxymethylene resin compositions and molded articles formed of the same include a stabilizing effective amount of an alkoxy-substituted phenoxy-containing compound having the formula (I) or (II):

$$Ar^1 - O - X \qquad (I)$$

$$Ar^2(-O-X)_s \qquad (II)$$

where $Ar^1$ represents an aryl group having no hydroxyl groups directly bonded thereto as a substituent, $Ar^2$ represents a benzene or naphthalene ring having no hydroxyl groups directly bonded thereto as a substituent, and s represents the number of alkoxy-derivative substituents. Preferably, $Ar^1$ in formula (I) is a phenyl, biphenyl or naphthyl group, and $Ar^2$ in formula (II) is benzene (with s being 2). $Ar^1$ and $Ar^2$ in formulas (I) and (II) may only be substituted with the —OX group, or may also contain other alkoxy group substituents. Preferably, a co-stabilizer, such as nitrogenous compounds, alkali or alkaline earth metal hydroxides, inorganic acid salts and carboxylic acid salts, are also present in the compositions of this invention.

7 Claims, No Drawings

STABILIZED POLYOXYMETHYLENE MOLDING COMPOSITIONS AND MOLDED ARTICLES FORMED THEREOF

FIELD OF INVENTION

The present invention relates to moldable, highly stable, normally solid polyoxymethylene (POM) resin compositions, and to stable molded articles formed of the same.

BACKGROUND AND SUMMARY OF THE INVENTION

As is well known, polyoxymethylene (POM) resins have been used in various fields as an engineering plastic due to the excellent physical properties (such as mechanical and electrical properties) and chemical properties (such as chemical resistance and heat-resistance properties) that such resins possess. As a result, polyoxymethylene resins have been used as a material to form component parts electric and electronic apparatus, automobiles and other machinery.

Notwithstanding the excellent inherent properties exhibited by polyoxymethylene resins generally, there is still a need for continual improvements to be made in this regard, especially as new and/or more specialized end-use applications for polyoxymethylene resins are identified. For example, some beneficial improvements to the properties of polyoxymethylene resins include: minimizing reductions in the mechanical strength of the resin during extrusion or molding operations; maintaining the color of the resin; reducing mold deposits that are formed during molding, and/or minimizing deterioration of the mechanical properties of the resin caused by heat aging. A principal factor which contributes to all of these aspects of polyoxymethylene resins generally is the propensity of the polymer chain to decompose ("unzip" to use art parlance) when heated.

Polyoxymethylene resin is, in and of itself, relatively easily decomposed when heated in an oxidizing atmosphere or under acidic or alkaline conditions due to its molecular structure. In this connection, the chemically active terminal groups of the polyoxymethylene chain can be stabilized by a variety of techniques so as to prevent (or at least significantly minimize) chain decomposition. For example, for polyoxymethylene homopolymers (i.e., having a linear chain composed solely of repeating oxymethylene units), greater stability can be achieved by esterifying or acetylating the chemically active terminal groups of the polymer chain.

The polyoxymethylene chain itself can be rendered more stable by copolymerizing trioxane, for example, with a monomer having adjacent carbon-carbon bonds such as a cyclic ether or a cyclic formal to yield a polyoxymethylene copolymer comprised mainly of repeating oxymethylene groups which are randomly interspersed with relatively more stable higher oxyalkylene groups (e.g., oxyethylene, oxypropylene, or the like). The resulting polyoxymethylene copolymer can then be hydrolyzed, for example, so as to remove terminal oxymethylene groups such that the resulting polymer has relatively more stable higher oxyalkylene groups at its terminal positions. However, even when a relatively stable, inert polyoxymethylene copolymer is produced, cleavage of the main polymer chain can sometimes occur when the polymer is heated. As a result, incorporating antioxidants and other stabilizing additives into the polyoxymethylene resin is typically an indispensable step to achieve a commercially viable polyoxymethylene resin.

Polyoxymethylene resins which are stabilized by the incorporation of antioxidants and/or other stabilizers are not, however, completly inhibited against decomposition. In fact, even such additive-stabilized polyoxymethylene resins are affected by heat and oxygen in the cylinder of a molding machine when the resin is molded to an extent that the resin chain may decompose to form formaldehyde. As a result of formaldehyde formation, the ambient environment of the molding machine can be polluted. In addition, a tarry mold deposit can form by virtue of polymer degradation which significantly reduces the efficiency of the molding operation as well as detrimentally affecting the surface condition of the resulting molded articles.

Heat aging of polyoxymethylene resin occurs when the resin is subjected to heat for prolonged periods of time. The consequence of heat aging is that the main polymer chain decomposes to an extent that the mechanical strength properties of the resin decrease. Thus, efforts have been attempted in this art to find a more effective stabilization additive and/or additive formulation. For example, hindered phenolic and amine compounds (i.e., sterically hindered phenols and hindered amines) have been added to polyoxymethylene resins in an attempt to improve the stability characteristics of the polyoxymethylene base resin. In addition, other stabilizers, including a combination of polyamides, urea derivatives, amidine compounds, alkali or alkaline earth metal hydroxides and organic or inorganic acid salts have also been employed for the same purpose.

Although hindered phenols are particularly effective antioxidants for polyoxymethylene resins, they are nonetheless weakly acidic which become more acidic due to conversion upon absorption of light. As a consequence, hindered phenols may serve as a polymer decomposition catalyst when used in large amounts thereby exacerbating the polymer's instability. Furthermore, oxidized hindered phenols can contribute to color losses in the polymer, and is a principal factor in the formation of mold deposits.

Thus, the formulation of a stabilizer or stabilization "system" having adequate molding stability, heat aging stability and weather resistance properties is a delicate balance of the attributes and detriments that are imparted to polyoxymethylene resin by any particular stabilizer. It is therefore towards providing polyoxymethylene resin of enhanced stability which minimizes (if not eliminates) the drawbacks associated with conventional stabilizer technologies that the present invention is directed.

Broadly, the present invention is characterized by the incorporation into polyoxymethylene resins of a stabilizing effective amount of specific alkoxy-substituted phenoxy-containing stabilizer compounds which improve the ability of the polyoxymethylene resin to withstand deterioration by oxidation and/or heat as well as minimizing the formation of mold deposits during extrusion. More specifically, the present invention relates to stable, moldable, normally solid polyoxymethylene resin compositions having a stabilizing effective amount of between 0.01 to 5% by weight, based on the polyoxymethylene base resin, of a phenoxy-containing compound having the following general formula (I) or (II):

$$Ar^1-O-X \qquad (I)$$

$$Ar^2(-O-X)_s \quad (II)$$

where $Ar^1$ represents an aryl group (excluding one having a hydroxyl group directly bonded thereto as a substituent), such as phenyl, biphenyl or naphthyl groups, and $Ar^2$ represents a benzene or naphthalene ring (excluding one having a hydroxyl group directly bonded thereto as a substituent), and s is an integer which represents the number of alkoxy-derivative substituents. Preferably, $Ar^2$ is a benzene ring.

The phenoxy-containing stabilizer may be incorporated into the polyoxymethylene base resin by any conventional technique, but is preferably melt-blended with the polyoxymethylene resin. The polyoxymethylene resin compositions may then be pelletized and used as a feedstock for extrusion and/or injection molding of components or parts associated with a variety of end-use applications.

Further aspects and advantages of this invention will become more clear after careful consideration is given to the following detailed description of the preferred exemplary embodiments thereof.

DETAILED DESCRIPTION OF THE PREFERRED EXEMPLARY EMBODIMENTS

In the general formulas (I) and (II) above, —OX represents a substituent other than a hydroxyl group. That is, the —OX group in the general formulas (I) and (II) represents one or more alkoxy derivatives wherein X is selected from among: $-C_mH_{2m+1}$, $-(C_mH_{2m}O)_nC_pH_{2p+1}$, $-C_mH_{2m}SC_pH_{2p+1}$, $-C_mH_{2m}COC_nH_{2n+1}$, $-C_mH_{2m}COOC_nH_{2n+1}$, $-C_mH_{2m}OCOC_nH_{2n+1}$, $-C_mH_{2m}CON(C_pH_{2p+1})(C_qH_{2q+1})$, $-C_mH_{2m}N(C_pH_{2p+1})COC_qH_{2q+1}$, $-C_mH_{2m}S(=O)_2C_nH_{2n+1}$, $-C_mH_{2n}P(=O)(R)C_nH_{2n+1}$, $-C_mH_{2m}P(=O)(R)OC_nH_{2n+1}$, $-C_mH_{2m}OP(=O)(R)C_nH_{2n+1}$ and $-C_mH_{2m}OP(=O)(R)OC_nH_{2n+1}$ where m and n are each integers from 1 to 20 (n preferably being 2 or 3), p and q are each integers from 0 to 20, and R is an alkyl or alkoxy group having 1 to 20 carbon atoms, a phenyl group or a phenoxy group. Particularly preferred examples for groups represented by X in the general formulas (I) and (II) include alkyl groups, hydroxyalkyl groups and condensates thereof such as $C_mH_{2m+1}$ or $-(C_mH_{2m}O)_nC_pH_{2p+1}$, ester groups such as $-C_mH_{2m}COOC_nH_{2n+1}$ or $-C_mH_{2m}OCOC_nH_{2n+1}$, or those having an amino group such as $-C_mH_{2m}N(C_pH_{2p+1})-(C_qH_{2q+1})$.

Specific examples of preferred alkyl groups include straight-chain alkyl groups and isopropyl, isobutyl, sec-butyl and tert-butyl groups. Examples of preferred hydroxyalkyl groups include hydroxyethyl, hydroxypropyl, hydroxybutyl, 3-hydroxy-2-methylpropyl, 2-hydroxy-2-methylpropyl, hydroxypentyl and 3-hydroxy-2,2-dimethylpropyl groups. Examples of preferred hydroxyalkyl group condensates include ethylene glycol, propanediol and 1,4-butane diol.

$Ar^1$ of the general formula (I) and $Ar^2$ of the generally formula (II) may have only the substituent —OX as defined above, or alternatively, may include one or more of the following substituents in addition to substituent —OX: $-C_mH_{2m+1}$, $-(C_mH_{2m}O)_nC_pH_{2p+1}$, $-C_mH_{2m}SC_pH_{2p+1}$, $-C_mH_{2m}CON(C_pH_{2p+1})(C_qH_{2q+1})$, $-C_mH_{2m}COC_nH_{2n+1}$, $-C_mH_{2m}COOC_nH_{2n+1}$, $-C_mH_{2m}OCOC_nH_{2n+1}$, $-C_mH_{2m}CON(C_pH_{2p+1})(C_qH_{2q+1})$, $-C_mH_{2m}N(C_pH_{2p+1})COC_nH_{2n+1}$, $-C_mH_{2m}S(=O)_2C_nH_{2n+1}$, $-C_mH_{2m}P(=O)(R)C_nH_{2n+1}$, $-C_mH_{2m}P(=O)(R)OC_nH_{2n+1}$, $-C_mH_{2m}OP(=O)(R)C_nH_{2n+1}$ and $-C_mH_{2m}OP(=O)(R)OC_nH_{2n+1}$ wherein m, n, p, q and R are each as defined previously. Preferably, those compounds satisfying the general formula (I) and (II) above having no substituent other than —OX, or those having substituents selected from $-C_mH_{2m+1}$, $-(C_mH_{2m}O)_nC_pH_{2p+1}$, $-C_mH_{2m}COOC_nH_{2n+1}$ or $-C_mH_{2m}CON(C_pH_{2p+1})(C_qH_{2q+1})$ are preferably employed. Such substituents are effective in improving the reactivity of the compound, improving the compatibility of the compound with the polyoxymethylene base resin, elevating the boiling point and sublimation temperatures so as to prevent the stabilizer from volatilizing at high temperatures. The number of substituents is not particularly limited and thus may include one or more substituents introduced in any of the ortho, meta and para-positions.

In the general formula (II) above, s represents the number of alkoxy derivative substituents in the compound. For example, when $Ar^2$ is a naphthalene ring, s can be 2 to 8, inclusive. The alkoxy derivatives that are present in the compound of formula (II) do not necessarily need to be identical. Furthermore, the substituents may be relatively positioned in any of the ortho, meta or para positions.

The phenoxy-containing compound of general formulas (I) and (II) is added to the polyoxymethylene base resin an an amount of between 0.01 to 5% by weight, preferably between 0.1 to 2% by weight, based on the weight of the polyoxymethylene resin. In this connection, the stabilization effects are poor when the phenoxy-containing compound is employed in insufficient amounts. On the other hand, when excessive amounts of the phenoxy-containing compound is used, polymer decomposition and discoloration of the polyoxymethylene resin may often be accelerated, rather than inhibited.

The polyoxymethylene base resin is a polymer which is comprised mainly of repeating oxymethylene ($CH_2O$) groups in its molecular chain. The polyoxymethylene base resin may thus be a polyoxymethylene homopolymer which, exclusive of end-capping units, includes only repeating oxymethylene units, or may be a polyoxymethylene copolymer, terpolymer or block copolymer, in which the polymer chain is composed predominantly of repeating oxymethylene units interspersed (either randomly or regularly) with one or more constituent units derived from a respective comonomer (preferably one having adjacent carbon-carbon bonds). The molecular structure of the polyoxymethylene base resin may be linear, or may be branched or cross-linked. Furthermore, the degree of polymerization of the polyoxymethylene base resin is not particularly limited, provided that it is normally solid at room temperatures (20° C.), and is moldable using conventional extrusion molding equipment.

Although significant stabilization effects can be obtained by using only the above-described phenoxy-containing compound, it may be used in combination with one or more nitrogenous compounds such as amines or amides, alkali or alkaline earth metal hydroxides, inorganic acid salts, metal-containing compounds such as carboxylates or alkoxides and sterically hindered phenol compounds.

The term "nitrogenous compounds" as used herein is intended to include homo- or copolymerized polyamides such as nylon 12, nylon 6.12 and nylon 6.66..610, substituted polyamides having a methylol group or the like, nylon salts, polyamides such as polyester amides synthesized from a combination with caprolactam, polyaminotriazoles, dicarboxylic acid dihydrazides, thermal condensates synthesized from urea by heating, uracils, cyanoguanidines, dicyandiamides, guanamine (2,4-diamino-sym-triazone), melamine, N-butylmelamine, N-phenylmelamine, N,N-diphenylmelamine, N,N-diallylmelamine, N,N',N''-triphpnylmelamine, N,N'N''-trimethylolmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dihydroxy-6-amino-sym-triazine (ammelide),2-hydroxy-4,6-diamino-sym-triazine (ammeline) and N,N,N',N'-tetracyanoethylbenzoguanamine. Hindered amines which will be illustrated below are also included within the definition of the term "nitrogenous compounds".

Examples of metal compounds include hydroxides, carbonates, phosphates, silicates, borates, carboxylates such as formates, malonates, succinates and adipates, salts of higher ($C_{10}$ to $C_{32}$) fatty acids such as stearic acid, and salts of higher fatty acids substituted with, for example, hydroxyl group, of sodium, potassium, magnesium, calcium, barium and the like. The metal compounds also include basic compounds having at least one tertiary nitrogen atom and a metal carboxylate in the molecule such as sodium N-methyliminodiacetate, trisodium nitrilotriacetate, tetrasodium ethylenediaminetetraacetate, dicalcium ethylenediaminetetraacetate, pentasodium diethylene triaminepentaacetate, pentapotassium diethylenepentaacetate, hexasodium triethylenetetraminehexaacetate and sodium ethyleneoxybis(ethylamine)N,N,N',N'-tetraacetate.

When the phenoxy-containing compound of formula (I) is used in combination with a known antioxidant, such as a hindered phenol or hindered amine, remarkable synergism is obtained in terms of thermal stability, particularly inhibition of heat aging.

Examples of hindered phenol antioxidants that may be used for this purpose include 2,2'-methylenebis(4-methyl-6-tert-butylphenol), 1,6-hexanediolbis[3-(3,5-di-tert-butyl-4-hydroxyphenyl)propionate],pentaerythritol tetrakis[3-(3,5-di-tert-butyl-4-hydroxyphenyl) propionate], triethylene glycol bis[3-(3-tert-butyl-5-methyl-4-hydroxyphenyl)-propionate) and N,N'-hexamehtylenebis(3,5-di-tert-butyl-4-hydroxyhydrocinnamide).

Preferred amine compounds are piperidine derivatives having a stearic hindrance group, such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetrampthylpiperidine, 4-(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate and bis(2,2,6,6-tetramethyl-4-piperidyl) sebacate. Furthermore, piperidine derivative polycondensates having a high molecular weight such as dimethylsuccinate-1-(2-hydroxyethyl)-4-hydroxy-2,2,6,6-tetramethylpiperidine polycondensate are also effective.

Other additives which are known in the art and which are conventionally incorporated into thermoplastic engineering resins generally may be employed in the compositions of this invention. Specific examples of such additives include antistatic agents, flame retardants, lubricants, nucleating agents, dyes and pigments, mold-release agents, surfactants, other thermoplastic polymers and the like. Furthermore, inorganic or organic filler materials in fiber, powder and/or flake form may also be incorporated into the compositions of this invention in order to obtain desired property enhancements.

Any conventional processing technique may be employed to form the compositions of this invention. For example, the polyoxymethylene base resin and phenoxy-containing compound as described above, may be directly charged into an extruder and then melt-kneaded to form pellets. The pellets may then be used to injection mold thin-walled articles. Alternatively, pellets having different compositions may first be prepared, with the pellets being thereafter mixed in desired proportions and supplied to a molding machine. Furthermore, the additive components may be mixed separately and then melt-blended with the polyoxymethylene base resin in an extruder to form pellets that can subsequently be used in molding operations. Finally, the additives may be pulverized into fine particles and then mixed prior to melt-blending so as to improve the homogeneity of the resulting melt-blended composition.

The resin composition of the present invention can be molded using any conventional molding technique, for example, extrusion, injection, compression, blow, foam and vacuum molding.

As described above, and as will become evident from the following Examples, since the phenoxy-containing compounds that are incorporated into the polyoxymethylene base resins do not have any acid or acid-forming components, they do not serve to adversely color the resin when subjected to heat aging. The polyoxymethylene resin compositions of this invention which include the phenoxy-containing compound as described previously also exhibit several advantageous properties, such as significantly reduced decomposition during molding; inhibiting reduction in the degree of polymerization (and therefore inhibiting reduction in the mechanical strength properties); as well as inhibiting mold deposits and adverse coloring. Thus, the polyoxymethylene resin compositions of this invention achieve balanced thermal stability properties without sacrificing the other beneficial properties inherent in polyoxymethylene resins generally.

EXAMPLES

The present invention will be further described in connection with the following non-limiting Examples.

EXAMPLES 1 TO 7 AND COMPARATIVE EXAMPLES 1 AND 2

A polyoxymethylene copolymer resin containing no stabilizer was pulverized and 0.3 part by weight of one of the following compounds was added to 100 parts by weight of the resin. The resulting mixture was thoroughly stirred in a nitrogen atmosphere.

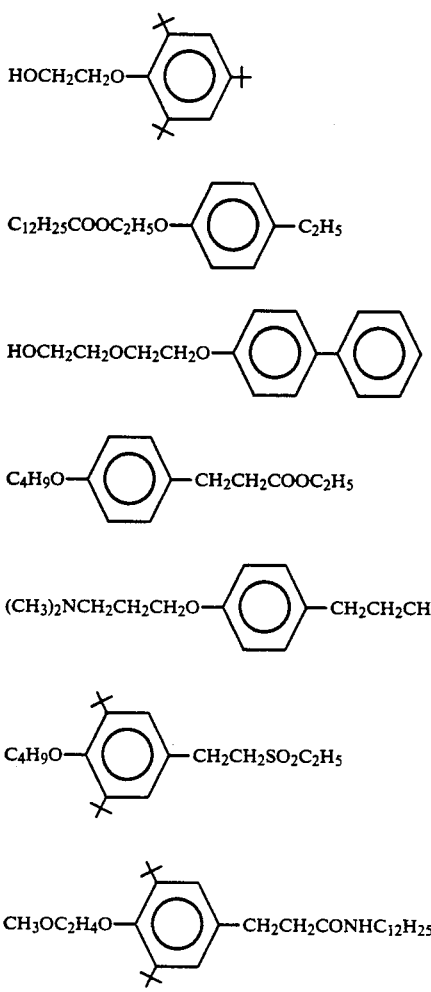

The extent of decomposition of the main chain of the polymer was determined based on a change in the melt viscosity caused by the reduction in the molecular weight with time. In this regard, 10 g of the mixture was charged into a melt indexer MX 101 (mfd. by Takara Kogyo K.K.) and maintained in a molten state at 210° C. for a predetermined period of time. The polymer melt was then passed through an orifice having an inner diameter of 2.09 mm under a load of 2.16 kg to determine the weight (MI value) of the resin which was discharged in 10 min. The determination was conducted after a residence time of 7, 30 and 60 min after the resin was first charged into the melt indexer. An increase in MI value after 60 min was determined by the following formula:

ΔMI=MI (60 min)−MI (7 min).

For comparison, the same procedure as that described above was repeated except that a polyoxymethylene copolymer resin containing either no additive or a polyoxymethylene copolymer comprised of 100 parts by weight of the polyoxymethylene resin and containing 0.3 part by weight of pentaerythrityl tetrakis [3-(3,5-di-tert-butyl-4-hydroxyphenyl)propionate] (Irganox 1010 mfd. by Ciba-Geigy) were used (Comparative Examples 1 and 2, respectively).

The results are given in Table 1 below.

TABLE 1

| | Additive | MI 7 min | MI 30 min | MI 60 min | ΔMI |
|---|---|---|---|---|---|
| Ex. 1 | A | 13.4 | 13.5 | 14.0 | 0.6 |
| Ex. 2 | B | 13.0 | 13.2 | 13.7 | 0.7 |
| Ex. 3 | C | 12.8 | 13.0 | 13.6 | 0.8 |
| Ex. 4 | D | 13.7 | 13.9 | 14.5 | 0.8 |
| Ex. 5 | E | 13.5 | 13.9 | 14.4 | 0.9 |
| Ex. 6 | F | 12.8 | 12.9 | 13.7 | 0.9 |
| Ex. 7 | G | 13.8 | 14.2 | 15.0 | 1.2 |
| Comp. Ex. 1 | none | 13.4 | 14.3 | 15.7 | 2.3 |
| Comp. Ex. 2 | Irg. 1010 | 12.7 | 13.4 | 14.1 | 1.4 |

In some cases, the initial MI value was elevated by the addition of the phenoxy compound. This phenomenon is quite possibly due to the lubricating effect of the additive, which is different from the mechanism resulting in the decomposition of the polymer. The elevation of the MI value of the composition of the present invention after 30 min was only slighty, which indicated that the decomposition of the polymer chain was quite efficiently inhibited. The increase (ΔMI) was only slight even after 60 min.

EXAMPLES 8 TO 14 AND COMPARATIVE EXAMPLES 3 AND 4

The polyoxymethylene copolymer resin was blended with one of the additives (A) to (G) identified previously. The mixture was then melt-kneaded and extruded in an extruder at 200° C. into pellets. 8 g of the pellets were melted and maintained in the melt indexer at 200° C. for 5 minutes. The melt was then allowed to be discharged from the melt indexer under the application of a load. Formaldehyde that was formed was recovered and quantified using the acetylacetone method. The amount of formaldehyde that was determined was noted in terms of the weight (ppm) of formaldehyde formed per unit weight of the resin. For comparison, the same procedure as that described above was repeated except that no additive was added (Comparative Example 3) or that Irganox 1010 was added (Comparative Example 4).

The pellets were kept in an injection molding machine at 200° C. for 1 h and then molded to form a plate-like molded article having a size of 40 mm×70 mm×2 mm. Adverse coloring caused by maintaining the resin in a molten state for such a prolonged period was measured with a differential colorimeter Z-1001 DP (mfd, by Nihon Densohoku Kogyo K.K.) to determine the yellowing factor (JIS K 7103).

The pellets were also injection-molded at a cylinder temperature of 200° C. into a plate-like molded articles having a size of 40 mm×70 mm×2 mm and tensile test pieces of type No. 1 of JIS K 7113 (thickness, 3 mm). The molded articles were left to stand at 140° C. for 8 days (heat aging) to evaluate the retention of tensile elongation with the tensile that pieces and examine the coloring (in terms of yellowing factor) with the platy molding.

The results are summarized in Table 2.

TABLE 2

| | Additive | Amount of formed gas (ppm) | Yellowing factor | After heat aging retention of elongation (%) | After heat aging yellowing factor |
|---|---|---|---|---|---|
| Ex. 8 | A | 85 | 4.9 | 32 | 12.0 |
| Ex. 9 | B | 83 | 4.6 | 35 | 11.9 |
| Ex. 10 | C | 85 | 4.5 | 35 | 11.9 |

TABLE 2-continued

| | Additive | Amount of formed gas (ppm) | Yellowing factor | After heat aging retention of elongation (%) | yellowing factor |
|---|---|---|---|---|---|
| Ex. 11 | D | 93 | 5.3 | 33 | 12.8 |
| Ex. 12 | E | 90 | 5.0 | 35 | 13.1 |
| Ex. 13 | F | 86 | 4.8 | 32 | 12.2 |
| Ex. 14 | G | 86 | 4.7 | 34 | 12.4 |
| Comp. Ex. 3 | none | 200 | 5.0 | 20 | cracked |
| Comp. Ex. 4 | Irg. 1010 | 125 | 5.8 | 30 | 13.3 |

In the tests of the compositions of the present invention (Examples), the amount of formaldehyde that was formed was drastically reduced and the resin color after a prolonged period of time in a molten state was extremely slight. Furthermore, effects were recognized in terms of improving the retention of the resin's elongation and inhibiting resin color-changes after the heat aging.

EXAMPLES 15 TO 20 AND COMPARATIVE EXAMPLES 5 TO 8

0.1, 1 and 2 parts by weight of the above-described compound (A) or (B) were each added to 100 parts by weight of an additive-free polyoxymethylene copolymer resin with the effects of these additive compounds then being evaluated in the same manner as that of Examples 1 to 14. For comparison, the same procedure as that described above was repeated except that either 0.005 or 10 parts by weight of the additive was incorporated into 100 parts by weight of the polyoxymethylene copolymer resin. The results are given in Table 3 below.

parts by weight, the effects in terms of inhibiting the decomposition of the polymer (e.g. as determined by the amount of formaldehyde gas formation) and retaining elongation properties were unsatisfactory. On the other hand, when an excessive amount of the additive (i.e., 10 parts by weight) was used, serious color changes ensued.

EXAMPLES 21 TO 27 AND COMPARATIVE EXAMPLE 9

0.3 parts by weight of one of the compounds (A) to (G) used in the Examples 1 to 7 and 0.2 parts by weight of melamine were added to 100 parts by weight of an additive-free polyoxymethylene copolymer resin and the effects were evaluated in the same manner as that of the Examples 1 to 14. For comparison, the same procedure as that described above was repeated except that only 0.2 parts by weight of melamine was added in the same manner as that described above. The results are given in Table 4.

TABLE 4

| | Additive: amount | MI 7 min | MI 30 min | MI 60 min | ΔMI | Amount of formed gas (ppm) | Yellowing factor | Heat aging retention of elongation (%) | yellowing factor |
|---|---|---|---|---|---|---|---|---|---|
| Ex. 21 | A + melamine | 13.1 | 13.2 | 13.6 | 0.5 | 53 | 4.5 | 45 | 11.4 |
| Ex. 22 | B + melamine | 13.1 | 13.3 | 13.7 | 0.6 | 71 | 4.7 | 48 | 12.0 |
| Ex. 23 | C + melamine | 12.8 | 12.9 | 13.4 | 0.7 | 70 | 4.2 | 48 | 11.6 |
| Ex. 24 | D + melamine | 13.5 | 13.6 | 14.0 | 0.5 | 83 | 5.0 | 41 | 12.1 |
| Ex. 25 | E + melamine | 13.2 | 13.4 | 13.7 | 0.5 | 77 | 4.6 | 43 | 12.4 |
| Ex. 26 | F + melamine | 12.3 | 12.5 | 13.0 | 0.7 | 64 | 4.3 | 48 | 12.0 |
| Ex. 27 | G + melamine | 13.8 | 14.0 | 14.5 | 0.7 | 65 | 4.4 | 43 | 11.9 |
| Comp. Ex. 9 | melamine | 13.1 | 14.0 | 15.0 | 1.9 | 100 | 5.0 | 25 | surface blushing |

It will be observed that the data in Table 4 show further improvement of the composition of the present invention in terms of inhibiting the formation of formaldehyde gas and retaining the elongation after heat aging.

EXAMPLES 28 TO 35 AND COMPARATIVE EXAMPLES 10 AND 11

0.2 parts by weight of a compound (A), (B), (C) or (D) used in the Examples 1 to 7, 0.2 parts by weight of Irganox 1010 (a phenolic antioxidant) or bis(2,2,6,6-tetramethyl-4-piperidyl) sebacate (a hindered amine antioxidant) (Sanol LS-770, a product of Sankyo Co., Ltd.) and 0.2 parts by weight of melamine were added to 100 parts by weight of the polyoxymethylene copolymer

TABLE 3

| | Additive: amount | | MI 7 min | MI 30 min | MI 60 min | ΔMI | Amount of formed gas (ppm) | Yellowing factor | Heat aging retention of elongation (%) | yellowing factor |
|---|---|---|---|---|---|---|---|---|---|---|
| Comp. Ex. 5 | A: 0.005 | pt. by wt. | 13.4 | 14.0 | 15.5 | 2.1 | 185 | 5.1 | 23 | cracked |
| Ex. 15 | A: 0.1 | pt. by wt. | 13.4 | 13.6 | 14.5 | 1.1 | 102 | 5.0 | 29 | 12.1 |
| Ex. 16 | A: 1 | pt. by wt. | 13.5 | 13.5 | 14.1 | 0.6 | 83 | 5.2 | 33 | 12.4 |
| Ex. 17 | A: 2 | pt. by wt. | 13.6 | 13.8 | 14.4 | 0.8 | 78 | 5.4 | 32 | 12.9 |
| Comp. Ex. 6 | A: 10 | pt. by wt. | 13.8 | 14.2 | 15.0 | 1.2 | 73 | 6.1 | 26 | 14.2 |
| Comp. Ex. 7 | B: 0.005 | pt. by wt. | 13.5 | 14.0 | 15.6 | 2.1 | 176 | 4.9 | 21 | cracked |
| Ex. 18 | B: 0.1 | pt. by wt. | 13.1 | 13.5 | 14.1 | 1.0 | 100 | 4.6 | 29 | 11.0 |
| Ex. 19 | B: 1 | pt. by wt. | 13.2 | 13.4 | 14.1 | 0.9 | 80 | 5.0 | 34 | 12.2 |
| Ex. 20 | B: 2 | pt. by wt. | 13.2 | 13.6 | 14.3 | 1.1 | 79 | 5.2 | 32 | 12.8 |
| Comp. Ex. 8 | B: 10 | | 13.3 | 14.0 | 15.2 | 1.9 | 78 | 6.0 | 30 | 14.3 |

As the data show, when the amount of the additive was within the range of the present invention, desirable results were obtained. However, when it was 0.005 resin. The effects of such additives were then evaluated in the same manner as that of the Examples 1 to 14.

In the Comparative Examples, 0.4 parts by weight of Irganox 1010 and 0.2 parts by weight of melamine (Comparative Example 10) or 0.4 parts by weight of Sanol LS-770 and 0.2 parts by weight of melamine (Comparative Example 11) were used and the effect was evaluated in the same manner as that described above. The results are summarized in Table 5.

a predetermined period of time. The molten resin was then pressed through an orifice having an inner diameter of 2.09 mm under a load of 2,16 kg to determine the weight (MI value) of the resin that was discharged in 10 minutes. The determination was conducted for residence times of 7, 30 and 60 min after the mixture was charged into the melt indexer. An increase in the MI

TABLE 5

| | Additive | MI 7 min | MI 30 min | MI 60 min | ΔMI | Amount of formed gas (ppm) | Yellowing factor | Heat aging retention of elongation (%) | Heat aging yellowing factor |
|---|---|---|---|---|---|---|---|---|---|
| Ex. 28 | A + Irg. 1010 + melamine | 13.0 | 12.9 | 13.5 | 0.5 | 51 | 4.7 | 56 | 11.6 |
| Ex. 29 | B + Irg. 1010 + melamine | 13.0 | 13.1 | 13.4 | 0.4 | 63 | 4.5 | 60 | 12.0 |
| Ex. 30 | C + Irg. 1010 + melamine | 13.0 | 13.3 | 13.5 | 0.5 | 67 | 4.7 | 52 | 12.7 |
| Ex. 31 | D + Irg. 1010 + melamine | 13.9 | 14.1 | 14.4 | 0.5 | 75 | 4.8 | 65 | 12.1 |
| Comp. Ex. 10 | Irg. 1010 + melamine | 12.8 | 13.1 | 13.6 | 0.7 | 84 | 5.1 | 53 | 13.0 |
| Ex. 32 | A + LS-770 + melamine | 13.2 | 13.2 | 13.4 | 0.6 | 46 | 4.4 | 63 | 10.8 |
| Ex. 33 | B + LS-770 + melamine | 12.9 | 13.1 | 13.3 | 0.4 | 64 | 3.9 | 58 | 10.7 |
| Ex. 34 | C + LS-770 + melamine | 13.0 | 13.2 | 13.5 | 0.5 | 65 | 4.5 | 55 | 11.9 |
| Ex. 35 | D + LS-770 + melamine | 13.4 | 13.9 | 14.5 | 0.6 | 70 | 4.2 | 61 | 11.3 |
| Comp. Ex. 11 | LS-770 + melamine | 12.9 | 13.0 | 13.6 | 0.7 | 82 | 4.7 | 54 | 12.0 |

The data in Table 5 also show that the retention of elongation for the compositions of the present invention was remarkably improved. On the other hand, when the combination with the hindered phenol was employed, although slight coloring was observed, the coloring level was lower than that found when the hindered phenol was used alone.

EXAMPLES 36 TO 41 AND COMPARATIVE EXAMPLES 12 AND 13

100 parts by weight of a stabilizer-free polyoxymethylene copolymer was pulverized, followed by the addition of 0.3 parts by weight of one of the following compounds (H) to (M). The resulting mixture was then thoroughly stirred in a nitrogen atmosphere.

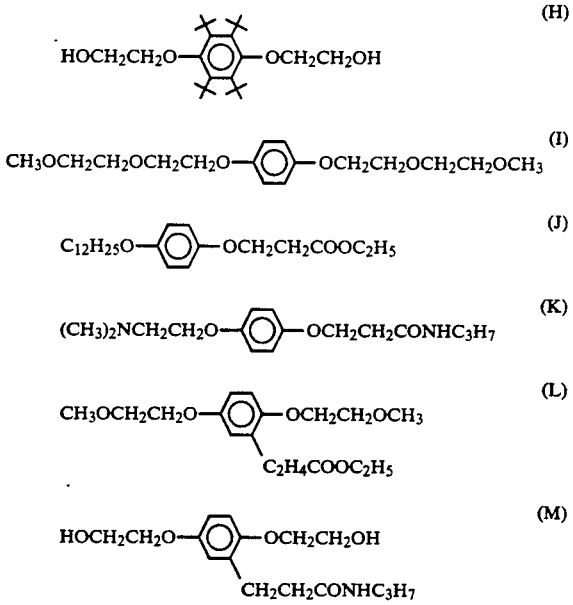

The extent of decomposition of the main chain of the polymer based on a change in the melt viscosity caused by the reduction of the molecular weight with time was determined by charging 10 g of the mixture into a melt indexer MX 101 (mfd. by Takara Kogyo K.K.) and maintaining the mixture in a molten state at 210° C. for value after 60 min was determined by the following formula:

$$\Delta MI = MI\ (60\ min) - MI\ (7\ min).$$

For comparison, the same procedure as that described above was repeated except that an additive-free polyoxymethylene copolymer resin was used or that 100 parts by weight of the polyoxymethylene copolymer resin containing 0.3 parts by weight of pentaerythritol tetrakis [3-(3,5-di-tert-butyl-4-hydroxyphenyl)propionate] (Irganox 1010 mfd. by Ciba-Geigy) were used (Comparative Examples 12 and 13, respectively). The results are given in Table 6.

TABLE 6

| | Additive | MI 7 min | MI 30 min | MI 60 min | ΔMI |
|---|---|---|---|---|---|
| Ex. 36 | H | 12.9 | 13.2 | 13.6 | 0.7 |
| Ex. 37 | I | 13.0 | 13.2 | 13.6 | 0.6 |
| Ex. 38 | J | 12.6 | 12.8 | 13.4 | 0.8 |
| Ex. 39 | K | 12.5 | 12.7 | 13.2 | 0.7 |
| Ex. 40 | L | 12.9 | 13.1 | 13.5 | 0.6 |
| Ex. 41 | M | 12.8 | 13.0 | 13.7 | 0.9 |
| Comp. Ex. 12 | none | 13.4 | 14.3 | 15.7 | 2.3 |
| Comp. Ex. 13 | Irg. 1010 | 12.7 | 13.4 | 14.1 | 1.4 |

As the data indicate, in some cases, the initial MI value was elevated by the addition of the phenoxy compound. This phenomenon is quite possibly due to the lubricating effect of the additive, which is a different mechanism as compared to the polymer decomposition. The elevation of the MI value of the composition of the present invention after 30 min was only slight, which indicated that the decomposition of the polymer chain was quite efficiently inhibited. The increase (ΔMI) was also only slight after 60 min.

EXAMPLES 42 TO 47 AND COMPARATIVE EXAMPLES 14 AND 15

Polyoxymethylene copolymer resin was blended with one of the additives identified as (H) to (M) in the same manner as that of the Examples 36 to 41. The resulting mixture was melt-kneaded and extruded in an extruder at 200° C. into pellets. 8 g of the pellets were melted and kept in the melt indexer at 200° C. for 5 min and then allowed to discharge under the application of a load. Formaldehyde that was formed was recovered, quantified by the acetylacetone method and reported in terms of the weight (ppm) of formaldehyde formed per unit weight of the resin. For comparison, the same procedure as that described above was repeated except that no additive was added (Comparative Example 14) or that Irganox 1010 was added (Comparative Example 15).

The pellets were kept in an injection molding machine at 200° C. for 1 h and then molded into a platy molding having a size of 40 mm x 70 mm ×2 mm. Coloring caused by the maintaining the resin in a melt state was measured with a differential colorimeter Z-1001 DP (mfd. by Nihon Densohoku Kogyo K. K.) to determine the yellowing factor (JIS K 7103).

The pellets were also injection-molded at a cylinder temperature of 200° C. into a platy molding having a size of 40 mm×70 mm×2 mm and tensile test pieces of type No. 1 of JIS K 7113 (thickness: 3 mm). The molding was left to stand at 140° C. for 8 days (heat aging) to evaluate the retention of tensile elongation with the tensile test pieces and examiner the coloring (in terms of yellowing factor) with the platy molding. The results are summarized in Table 7.

TABLE 7

|  | Additive | Amount of formed gas (ppm) | Yellowing factor | After heat aging | |
|---|---|---|---|---|---|
|  |  |  |  | retention of elongation (%) | yellowing factor |
| Ex. 42 | H | 70 | 4.5 | 34 | 12.6 |
| Ex. 43 | I | 69 | 4.7 | 31 | 12.9 |
| Ex. 44 | J | 71 | 5.1 | 34 | 13.0 |
| Ex. 45 | K | 78 | 4.7 | 29 | 12.5 |
| Ex. 46 | L | 69 | 5.1 | 35 | 12.8 |
| Ex. 47 | M | 89 | 4.6 | 21 | 12.4 |
| Comp. Ex. 14 | none | 200 | 5.0 | 20 | cracked |
| Comp. Ex. 15 | Irg. 1010 | 125 | 5.8 | 30 | 13.3 |

In the tests of the compositions of the present invention (Examples), the amount of formaldehyde gas that formed was remarkably reduced, and the resin color after being subjected to melt conditions for prolonged time periods was extremely slight. Furthermore, significant beneficial effects were seen also in terms of improving the elongating retention and inhibiting the color changes after the heat aging.

EXAMPLES 48 TO 53 AND COMPARATIVE EXAMPLES 16 TO 19

0.1, 1 or 2 parts by weight of the compound (H) or (I) was added to 100 parts by weight of the additive-free polyoxymethylene copolymer resin. The effects of these compositions were evaluated in the same manner as that of the Examples 36 to 47. For comparison, the same procedure as that described above was repeated except that 0.005 or 10 parts by weight of the additive was added to 100 parts by weight of the polyoxymethylene copolymer resin. The results are given in Table 8.

TABLE 8

|  | Additive: amount | | MI | | | ΔMI | Amount of formed gas (ppm) | Yellowing factor | After heat aging | |
|---|---|---|---|---|---|---|---|---|---|---|
|  |  |  | 7 min | 30 min | 60 min |  |  |  | retention of elongation (%) | yellowing factor |
| Comp. Ex. 16 | H: 0.005 | pt. by wt. | 13.4 | 14.1 | 15.6 | 2.2 | 185 | 5.0 | 23 | cracked |
| Ex. 48 | H: 0.1 | pt. by wt. | 12.9 | 13.3 | 14.0 | 1.1 | 75 | 4.4 | 30 | 12.6 |
| Ex. 49 | H: 1 | pt. by wt. | 13.0 | 13.2 | 13.7 | 0.7 | 68 | 4.6 | 34 | 12.8 |
| Ex. 50 | H: 2 | pt. by wt. | 13.2 | 13.3 | 14.1 | 0.9 | 66 | 4.9 | 36 | 13.1 |
| Comp. Ex. 17 | H: 10 | pt. by wt. | 13.4 | 13.7 | 14.5 | 1.1 | 70 | 5.5 | 35 | 14.6 |
| Comp. Ex. 18 | I: 0.005 | pt. by wt. | 13.3 | 14.1 | 15.4 | 2.1 | 178 | 4.9 | 23 | cracked |
| Ex. 51 | I: 0.1 | pt. by wt. | 13.0 | 13.4 | 13.9 | 0.9 | 78 | 4.7 | 31 | 12.8 |
| Ex. 52 | I: 1 | pt. by wt. | 13.1 | 13.3 | 13.7 | 0.6 | 66 | 4.8 | 34 | 13.0 |
| Ex. 53 | I: 2 | pt. by wt. | 13.2 | 13.4 | 13.9 | 0.7 | 65 | 5.1 | 37 | 13.2 |
| Comp. Ex. 19 | I: 10 | pt. by wt. | 13.5 | 13.9 | 15.0 | 1.5 | 63 | 5.9 | 35 | 14.0 |

As the data show, when the amount of the additive was within the range of the present invention, desirable results were obtained. However, when the amount was 0.005 parts by weight, the effect in inhibiting the decomposition of the polymer, the formation of formaldehyde gas and elongation retention was unsatisfactory. On the other hand, when an excessive amount (e.g., 10 parts by weight) of the additive was used, adverse resin coloring ensued.

EXAMPLES 54 TO 59 AND COMPARATIVE EXAMPLE 20

0.3 parts by weight of one of the compounds (H) to (M) described in the Examples 36 to 41 and 0.2 parts by weight of melamine were added to 100 parts by weight of the additive-free polyoxymethylene copolymer resin. The effects of such additives were evaluated in the same manner as that of Examples 36 to 47. For comparison, the same procedure as that described above was repeated except that only 0.2 parts by weight of melamine was added in the same manner as that described above. The results are given in Table 9.

TABLE 9

|  | Additive: amount | MI | | | ΔMI | Amount of formed gas (ppm) | Yellowing factor | After heat aging | |
|---|---|---|---|---|---|---|---|---|---|
|  |  | 7 min | 30 min | 60 min |  |  |  | retention of elongation (%) | yellowing factor |
| Ex. 54 | H + melamine | 13.1 | 13.3 | 13.6 | 0.5 | 60 | 4.3 | 44 | 12.4 |
| Ex. 55 | I + melamine | 12.9 | 13.0 | 13.4 | 0.5 | 62 | 4.7 | 36 | 13.2 |
| Ex. 56 | J + melamine | 12.4 | 12.7 | 13.1 | 0.7 | 65 | 4.9 | 42 | 12.8 |
| Ex. 57 | K + melamine | 12.3 | 12.5 | 13.0 | 0.7 | 71 | 4.8 | 40 | 12.4 |
| Ex. 58 | L + melamine | 12.8 | 12.9 | 13.3 | 0.5 | 63 | 5.0 | 39 | 12.9 |
| Ex. 59 | M + melamine | 12.8 | 13.1 | 13.5 | 0.7 | 76 | 4.4 | 37 | 12.3 |

TABLE 9-continued

| | Additive: amount | MI 7 min | 30 min | 60 min | ΔMI | Amount of formed gas (ppm) | Yellowing factor | After heat aging retention of elongation (%) | yellowing factor |
|---|---|---|---|---|---|---|---|---|---|
| Comp. Ex. 20 | melamine | 13.1 | 14.0 | 15.0 | 1.9 | 100 | 5.0 | 25 | surface blushing |

The data in Table 9 show that further improvements in the compositions of the present invention are observed in terms of inhibiting the formation of formaldehyde gas and elongation retention after heat aging.

EXAMPLES 60 TO 67 AND COMPARATIVE EXAMPLES 21 AND 22

0.2 parts of a compound (H), (I), (J) or (K) used in the Examples 36 to 41, 0.2 parts by weight of Irganox 1010 (a phenolic antioxidant) or bis(2,2,6,6-tetramethyl-4-piperidyl) sebacate (a hindered amine antioxidant) (Sanol LS-770, a product of Sankyo Co., Ltd.) and 0.2 parts by weight of melamine were added to 100 parts by weight of polyoxymethylene copolymer. The effects of these additives were evaluated in the same manner as that of the Examples 36 to 47.

In the Comparative Examples, 0.4 parts by weight of Irganox 1010 and 0.2 parts by weight of melamine (Comparative Example 21) or 0.4 parts by weight of Sanol LS-7770 and 0.2 parts by weight of melamine (Comparative Example 22) were used and the effects were evaluated in the same manner as that described above. The results are summarized in Table 10.

$$Ar^1—O—X \quad (I)$$

$$Ar^2(—O—X) \quad (II)$$

where $Ar^1$ represents an aryl group having no hydroxyl groups directly bonded thereto as a substituent, $Ar^2$ represents a benzene or naphthalene ring having no hydroxyl groups directly bonded thereto as a substituent, s represents the number of alkoxy-derivative substituents, and X is selected from among: $—C_mH_{2m+1}$, $—(C_mH_{2m}O)_nC_pH_{2p+1}$, $—C_mH_{2m}SC_pH_{2p+1}$, $—C_mH_{2m}N(C_pH_{2p+1})(C_qH_{2q+1})$, $—C_mH_{2m}COC_nH_{2n+1}$, $—C_mH_{2m}COOC_nH_{2n+1}$, $—C_mH_{2m}OCOC_nH_{2n+1}$, $—C_mH_{2m}CON(C_pH_{2p+1})(C_qH_{2q+1})$, $—C_mH_{2m}N(C_pH_{2p+1})COC_qH_{2q+1}$, $—C_mH_{2m}S(=O)_2C_nH_{2n+1}$, $—C_mH_{2m}P(=O)(R)C_nH_{2n+1}$, $—C_mH_{2m}P(=O)(R)OC_nH_{2n+1}$, $—C_mH_{2m}OP(=O)(R)C_nH_{2n+1}$ and $—C_mH_{2m}OP(=O)(R)OC_nH_{2n+1}$ wherein m an n are each integers from 1 to 20, p and q are each integers from 0 to 20, and R is an alkyl or alkoxy group having 1 to 20 carbon atoms, a phenyl group or a phenoxy group; and

TABLE 10

| | Additive | MI 7 min | 30 min | 60 min | ΔMI | Amount of formed gas (ppm) | Yellowing factor | After heat aging retention of elongation (%) | yellowing factor |
|---|---|---|---|---|---|---|---|---|---|
| Ex. 60 | H + Irg. 1010 + melamine | 13.0 | 13.1 | 13.4 | 0.4 | 56 | 4.4 | 51 | 12.6 |
| Ex. 61 | I + Irg. 1010 + melamine | 13.0 | 13.2 | 13.5 | 0.5 | 54 | 4.7 | 49 | 13.2 |
| Ex. 62 | J + Irg. 1010 + melamine | 12.3 | 12.4 | 12.8 | 0.5 | 56 | 5.1 | 52 | 13.0 |
| Ex. 63 | K + Irg. 1010 + melamine | 12.4 | 12.5 | 13.0 | 0.6 | 58 | 5.0 | 54 | 12.8 |
| Comp. Ex. 21 | Irg. 1010 + melamine | 12.8 | 13.1 | 13.6 | 0.8 | 84 | 5.1 | 53 | 13.0 |
| Ex. 64 | H + LS-770 + melamine | 12.9 | 13.1 | 13.3 | 0.4 | 49 | 4.4 | 52 | 12.5 |
| Ex. 65 | I + LS-770 + melamine | 12.8 | 13.0 | 13.2 | 0.4 | 54 | 4.5 | 53 | 13.1 |
| Ex. 66 | J + LS-770 + melamine | 12.4 | 12.5 | 12.9 | 0.5 | 52 | 4.4 | 55 | 12.7 |
| Ex. 67 | K + LS-770 + melamine | 12.3 | 12.4 | 12.9 | 0.6 | 53 | 4.9 | 51 | 12.4 |
| Comp. Ex. 22 | LS-770 + melamine | 12.9 | 13.0 | 13.6 | 0.7 | 82 | 4.7 | 54 | 12.0 |

The data in Table 10 show that remarkable improvements for the compositions of the present invention were observed in terms of elongation retention. On the other hand, when the composition further included a hindered phenol was employed, although slight coloring was observed, the coloring level was lower than that found when the hindered phenol was used alone.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable stabilized polyoxymethylene resin molding composition comprising a polyoxymethylene base resin, and a stabilizing effective amount of an alkoxy substituted phenoxy-containing compound having the following general formula (I) or (II):

wherein $Ar^1$ and $Ar^2$ in the formulas (I) and (II) are either substituted only by the —OX moiety, or include at least one substituent other than the —OX moiety which is selected from among: $—C_mH_{2m}H_{2m+1}$, $—(C_mH_{2m}O)_nC_pH_{2p+1}$, $—C_mH_{2m}SC_pH_{2p+1}$, $—C_mH_{2m}COC_nH_{2n+1}$, $—C_mH_{2m}COOC_nH_{2n+1}$, $—C_mH_{2m}OCOC_nH_{2n+1}$, $—C_mH_{2m}S(=O)_2C_nH_{2n+1}$, $—C_mH_{2m}P(=O)(R)C_nH_{2n+1}$, $—C_mH_{2m}P(=O)(R)OC_nH_{2n+1}$, $—C_mH_{2m}OP(=O)(R)C_nH_{2n+1}$, $—C_mH_{2m}OP(=O)(R)OC_nH_{2n+1}$, $—C_mH_{2m}N(C_pH_{2p+1})(C_qH_{2q+1})$, $—C_mH_{2m}CON(C_pH_{2p+1})(C_qH_{2q+1})$ and $—C_mH_{2m}N(C_pH_{2p+1})COC_nH_{2n+1}$.

2. A polyoxymethylene resin composition as in claim 1, wherein $Ar^1$ is a phenyl, biphenyl or naphthyl group.

3. A polyoxymethylene resin composition as in claim 1, wherein $Ar^1$ is a benzene ring, and wherein s is 2.

4. A polyoxymethylene resin composition as in claim 1, wherein said phenoxy-containing compound is present in an amount between about 0.01 to 5% by weight, based on the weight of the polyoxyethylene base resin.

5. A polyoxymethylene resin composition as in claim 1, which further comprises a co-stabilizer selected from among phenolic compounds, nitrogenous compounds, alkali or alkaline earth metal hydroxides, inorganic acid salts and carboxylic acid salts.

6. A polyoxymethylene resin composition as in claim 1, wherein said polyoxymethylene base resin is a polyoxymethylene homopolymer which, exclusive of terminal groups, consists of repeating oxymethylene units, or a polyoxymethylene copolymer which is mainly comprised of repeating oxymethylene groups interspersed either randomly or regularly with higher oxyalkylene groups.

7. A molded article which consists essentially of the polyoxymethylene resin composition as in any one of the preceding claims.

* * * * *